United States Patent [19]

Fowler et al.

[11] Patent Number: 5,331,881
[45] Date of Patent: Jul. 26, 1994

[54] HELICOPTER INTEGRATED FIRE AND FLIGHT CONTROL HAVING AZIMUTH AND PITCH CONTROL

[75] Inventors: Donald W. Fowler, Oxford; Nicholas D. Lappos, Milford, both of Conn.; James B. Dryfoos, Wallingford; James F. Keller, Media, both of Pa.

[73] Assignee: United Technologies Corporation, Hartford, Conn.

[21] Appl. No.: 885,702

[22] Filed: May 19, 1992

[51] Int. Cl.$^5$ ............................................. F41G 3/22
[52] U.S. Cl. ................................. 89/41.21; 89/41.06; 364/423
[58] Field of Search ................. 89/41.21, 41.06, 41.07, 89/41.08, 41.19; 364/423

[56] References Cited

U.S. PATENT DOCUMENTS

| 2,979,289 | 4/1961 | Abzug | 89/41.07 |
| 4,012,989 | 3/1977 | Hunt et al. | 89/41.21 |
| 5,001,646 | 3/1991 | Caldwell et al. | 364/434 |

FOREIGN PATENT DOCUMENTS

| 89273 | 9/1983 | European Pat. Off. | 89/41.06 |
| 909900 | 11/1962 | United Kingdom | 89/41.07 |

OTHER PUBLICATIONS

McDonnell Douglas Helicopter Company, Integrated Air-to-Air Weapon (INTAAW) Evaluation System Definition Report, Final Issue, 23 Jan. 90, pp. 6-1 to 6-31.
"A Simulator Investigation of Parameters Affecting Helicopter Handling Qualitites in Air Combat (HAC II)", pp. 1-18, by Michael S. Lewis and M. Hossein Mansur, Aerospace Engineers, Ames Research Center; and Robert T. M. Chen, NASA Ames Research Center.
IFEE AES Systems Magazine, Jan. 1992, "Integrated Flight/Fire Control for Attack Helicopters", pp. 17-23, by Stephen Osder of McDonnell Douglas Helicopter Company.
Chief Engineer, vol. 6, No. 4, Jul.-Aug. 1983, "Design and Analysis of a Digitally Controlled Integrated Flight/Fire Control System", pp. 251-257, by John H. Blakelock, Applications Research Corporation.

Primary Examiner—Stephen M. Johnson
Attorney, Agent, or Firm—Michael Grillo

[57] ABSTRACT

A fire control system (55) azimuth command and elevation command provides a flight control system attitude reference in response to operation of the flight control system in a coupled aiming mode. The coupled aiming mode is engaged in response to the continuous operation of a pilot switch (920) the azimuth command and elevation command being below respective threshold magnitudes (940, 941), and the operation of the fire control system (55). During operation in the coupled aiming mode, the azimuth command and elevation command replace the yaw attitude feedback error signal and pitch attitude error signal, respectively, as the aircraft attitude reference. During integration of the fire control system and the flight control system, the flight control system is made less sensitive to small pilot command stick inputs below a stick input threshold magnitude, so that small or inadvertent pilot commanded yaw and pitch maneuvers will not affect the yaw and pitch attitude reference commanded by the fire control system azimuth and elevation commands. However, intended pilot commanded yaw and pitch maneuvers (70) maintain full authority at all times.

8 Claims, 13 Drawing Sheets

HELICOPTER INTEGRATED FIRE AND FLIGHT CONTROL HAVING AZIMUTH AND PITCH CONTROL

The Government has rights in the invention pursuant to a contract awarded by the Department of the Army.

DESCRIPTION

1. Technical Field

The present invention relates to flight control systems for rotary wing aircraft and more particularly to an integrated fire and flight control system which provides aircraft azimuth and pitch control based on a fire control system targeting solution.

2. Background of the Invention

The combat uses for helicopter aircraft have changed dramatically over the years to include contact with opposing forces, including reconnaissance and combat aircraft assistance of troops on the front line. This type of use subjects helicopters to numerous threats, and therefore new helicopter designs incorporate offensive weapons, such as Gatling guns and rocket launchers.

Initially, the primary control of helicopter weapons was accomplished by the pilot aiming the aircraft at the target prior to firing. Correction for misses was accomplished by the pilot adjusting the attitude of the aircraft prior to expending additional ordnance. As technology developed, tracking and sensing systems were used to locate the target and determine the aircraft attitude necessary to aim the weapon so as to account for outside forces acting on the ordnance, e.g., wind, aircraft speed, etc. Such a system typically displays a "cross-hair" indicative of actual aircraft attitude and a geometric shape indicative of the required aircraft attitude to provide a high probability of striking the target with the weapon. The pilot is required to maneuver the aircraft so as to place the cross-hair in the firing solution defined by the shape prior to firing the weapon. The aiming instructions e.g., cross-hair and geometric shape, are typically displayed on a control panel, a heads-up display, or helmet-mounted display which provides the pilot with visual information relating to the target position, ownship attitude, heading, speed and altitude.

Although such aiming systems improved weapons delivery accuracy, the pilot is still under a significant burden to regulate aircraft heading and pitch attitude. It is well-known that a skilled helicopter pilot can control aircraft attitude within about 1 degree of pitch and yaw. Although this may seem very accurate control, a 1 degree variation in pitch or yaw will have a significant effect on the trajectory of a projectile.

DISCLOSURE OF THE INVENTION

Objects of the invention include provision of an improved flight control system for a rotary wing aircraft, which is integrated with an aircraft fire control system for using an existing fire control solution to control the aircraft yaw attitude and pitch attitude during weapons targeting, thereby improving overall weapons effectiveness by increasing ordnance delivery accuracy.

A further object of the present invention is to provide an integrated fire and flight control system which uses a fire control solution to control aircraft yaw attitude and pitch attitude only when the aircraft is within a specific engagement window, and which maintains pilot command authority to override the fire control solution effects on aircraft yaw attitude and pitch attitude.

According to the present invention, the occurrence of a fire control solution azimuth command or elevation command being below a respective threshold magnitude induces a fade-in of the fire control solution azimuth and elevation commands as the aircraft attitude reference, replacing the flight control system yaw attitude feedback error signal and pitch attitude feedback error signal, respectively.

In further accord with the present invention, the fire control system is integrated with the flight control system only while the pilot manually depresses and holds an enable switch, and during integration of the fire control system and the flight control system, the pilot stick control path remains the primary input to the flight control system to thereby provide override capability for pilot commanded yaw and pitch maneuvers.

In still further accord with the present invention, during integration of the fire control system and the flight control system, the flight control system is made less sensitive to small pilot commanded stick inputs below a stick input threshold magnitude, so that small or inadvertent pilot commanded yaw and pitch maneuvers will not affect the yaw and pitch attitude reference commanded by the fire control system azimuth and elevation commands, while maintaining full authority for intended pilot commanded yaw and pitch maneuvers.

The present invention reduces pilot workload during weapons aiming and improves overall weapons effectiveness since the fire control solution is used to automatically provide a commanded pitch and yaw attitude reference. A limited authority engagement window constrains the effective authority of the fire control solution, while maximizing its performance while on target. When the fire control system azimuth and elevation commands are providing the yaw and pitch attitude reference, the system is transparent to the pilot except for the aircraft's tendency to remain aimed at the proper firing solution. The pilot commanded stick input maintains primary authority, and therefore the pilot is capable of fully exercising the aircraft's inherent agility for evasive maneuvers, to break lock from enemy targeting systems or to engage new threats.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

The integrated fire and flight control (IFFC) system of the present invention is particularly well suited for aiding a helicopter pilot in the target acquisition phase of the mission, and for improving the overall weapons effectiveness by increasing ordnance delivery accuracy.

When a pilot has engaged a target, and an aircraft fire control system is activated and a weapon is selected, current fire control systems employ symbology to direct the pilot on the proper aircraft attitude to assume to deliver the selected ordnance at the target location. A cross-hair is displayed which symbolizes the aircraft's current attitude, and a geometric shape, e.g., a diamond, box, ellipse, circle, etc., is displayed which represents the acceptable firing solution. The pilot then attempts to maneuver the aircraft so that the cross-hair appears within the geometric shape to achieve a successful weapons delivery event. For certain ordnance, the pilot is required to achieve and maintain a very accurate aircraft attitude for a successful weapons delivery. This places a significant burden on the pilot to regulate heading and pitch angle.

Figure 1:
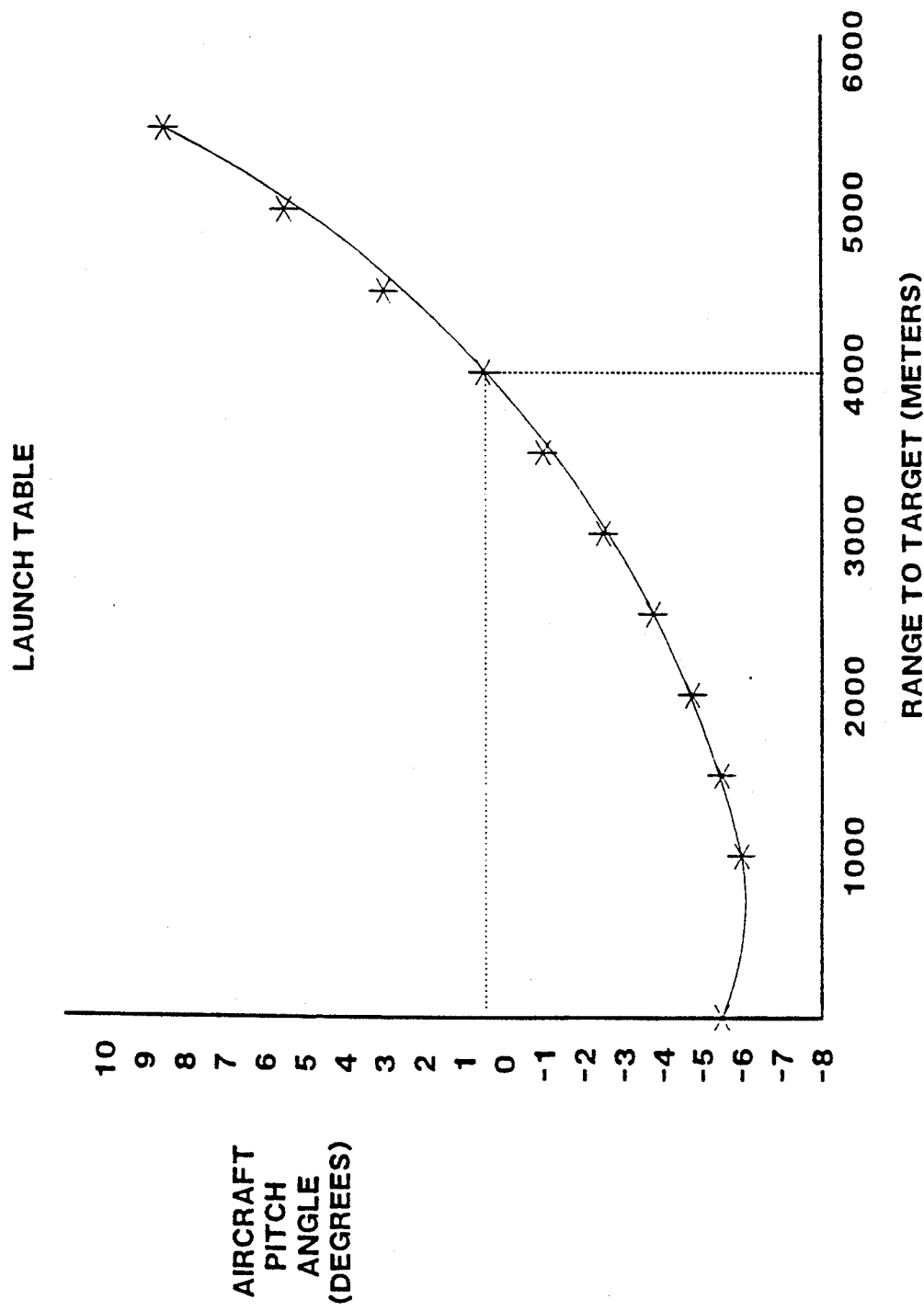
FIG. 1 is a graph showing the relationship between aircraft pitch angle and ordnance range for a Mark 40 2.75 inch folding fin aerial rocket having a ten-pound warhead.

Referring to FIG. 1, a launch table shows the relationship between aircraft pitch angle and ordnance delivery range for a Mark 40, 2.75 inch, folding fin aerial rocket having a ten-pound warhead. For example, the pilot is required is achieve a ½ degree pitch angle to deliver the ordnance at a range of 4,000 meters. This graph assumes that the aircraft and the target are at the same altitude. Further adjustments are required if the target is at a different altitude from the aircraft.

Figure 2:
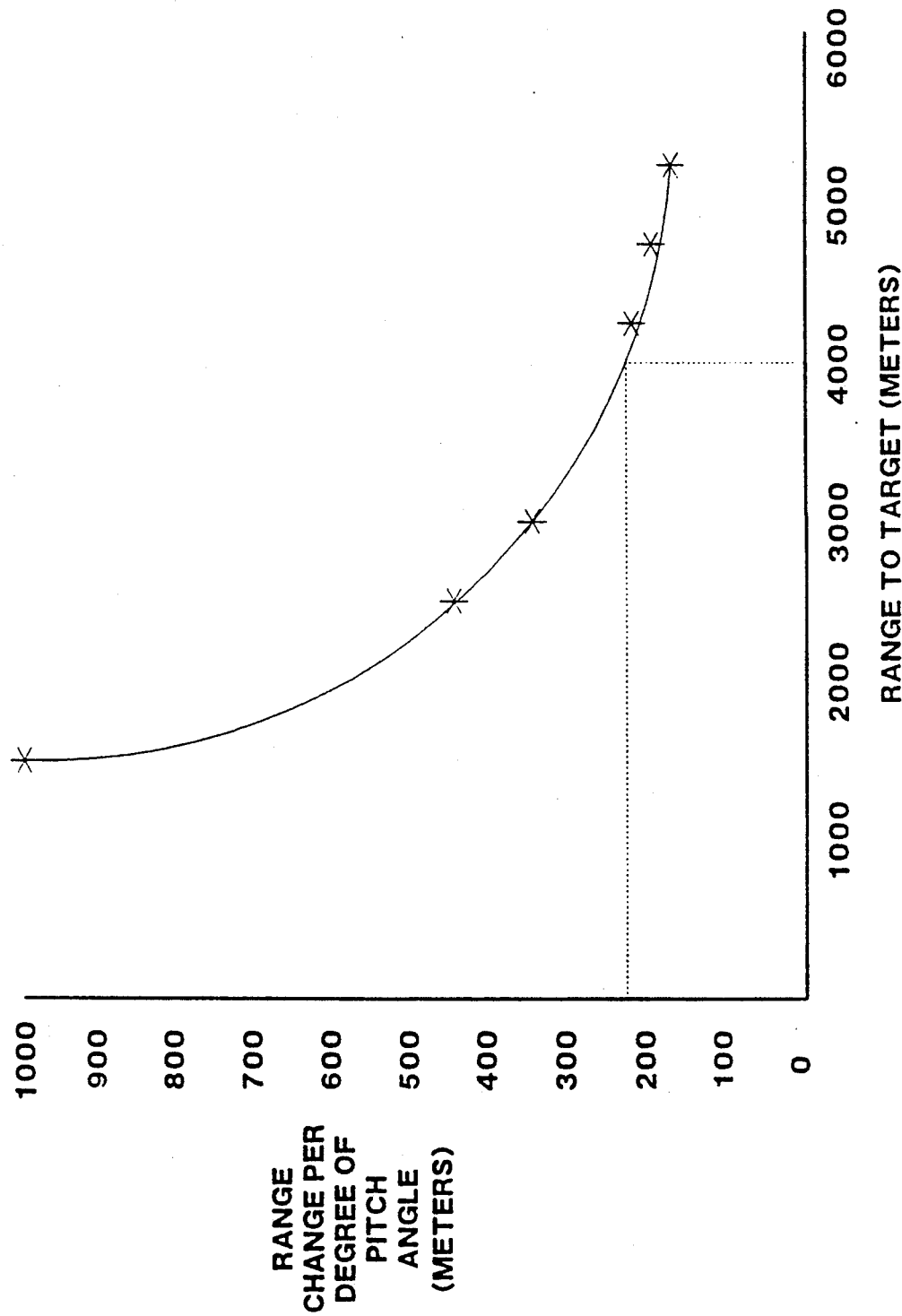
FIG. 2 is a graph showing the relationship between the change in ordnance delivery range per degree of pitch angle and the range to the target for the Mark 40 rocket of FIG. 1.
Figure 3:
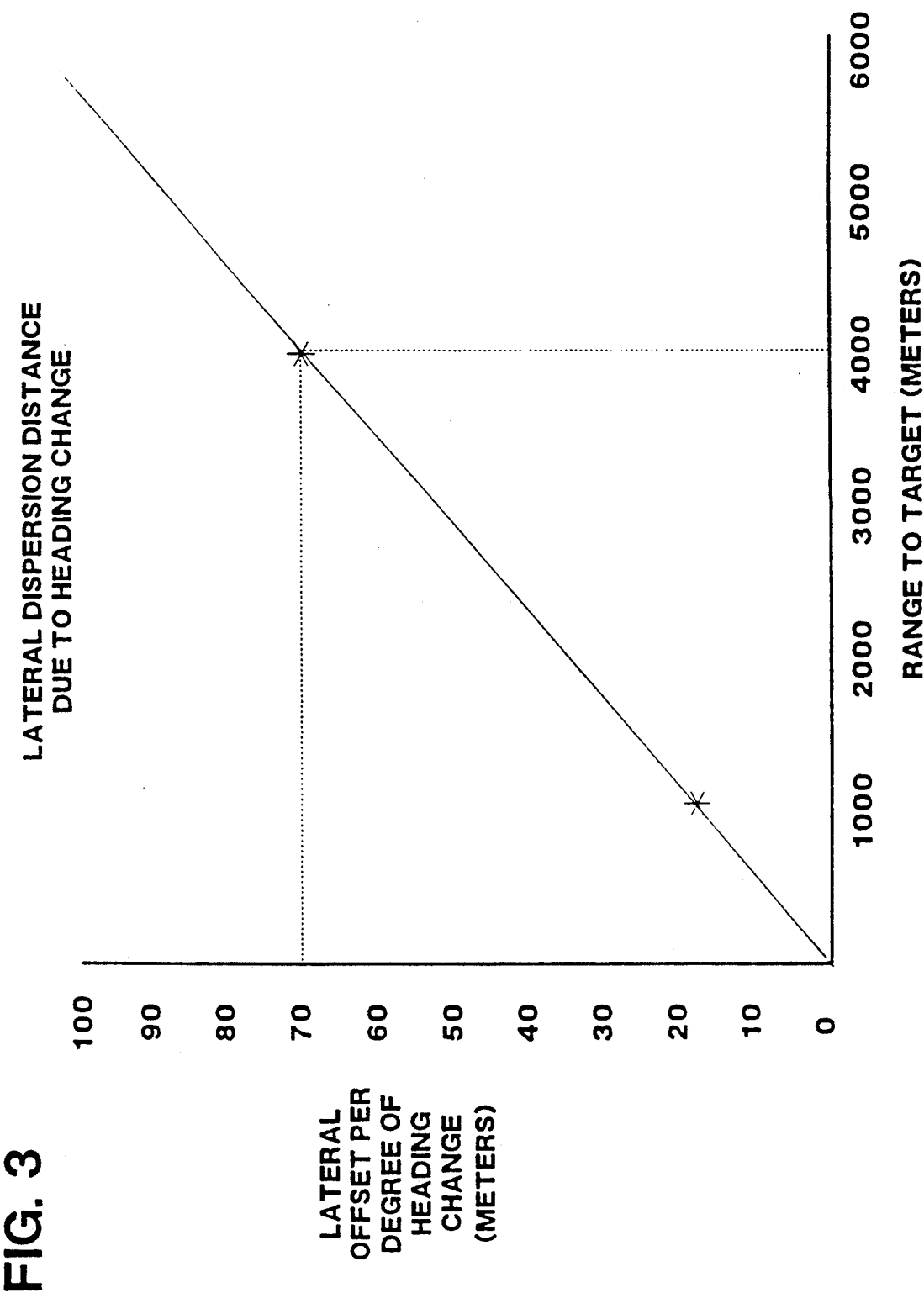
FIG. 3 is a graph showing the relationship between the lateral offset per degree of heading change and the range to the target for the Mark 40 rocket of FIG. 1.

It is well-known that a skilled pilot is able to control pitch and yaw attitude within about ±1 degree. FIG. 2 illustrates the variations in impact point caused by a 1 degree change in pitch angle depending on the range to the target. For example, at a 4,000 meter range, a 1 degree pitch angle change will move the impact point by approximately 250 meters. FIG. 3 illustrates the variation in impact point per degree of heading change for targets at various ranges. For example, at a 4,000 meter range, a 1 degree heading change will offset the impact point by approximately 70 meters. It will therefore be understood that to achieve a high probability of impact, the pilot is required to expend numerous ordnance to increase the probability of a successful impact.

The integrated fire and flight control system of the present invention improves the accuracy of aiming pitch and yaw attitude to within about ±0.1 degree of the fire control system firing solution. The system greatly enhances the accuracy of weapons delivery, while reducing the pilot workload during weapons delivery. Additionally, the pilot is required to expend much less ordnance in order to achieve a suitable probability of impacting the target.

Figure 4:
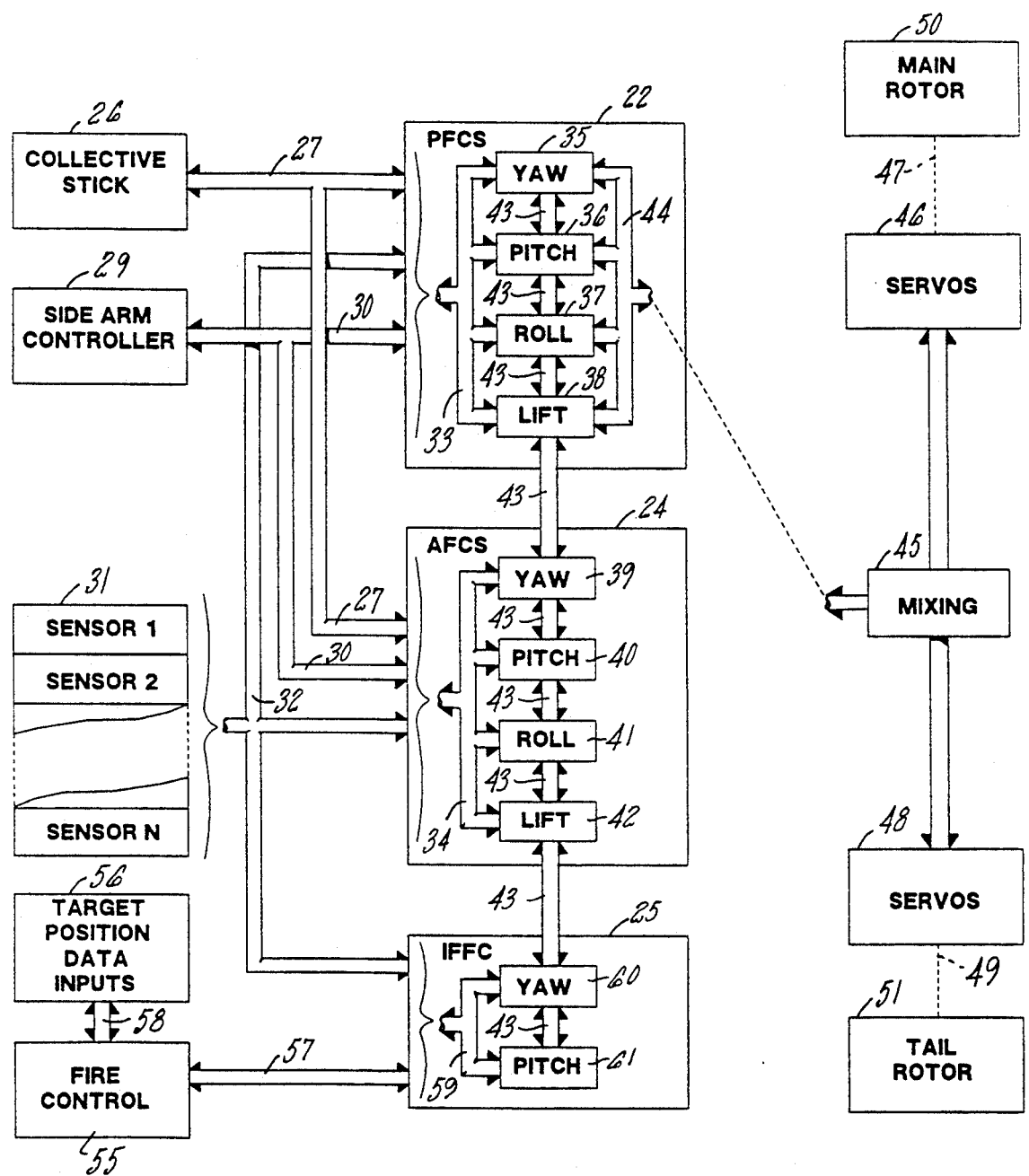
FIG. 4 is a block diagram of the integrated fire and flight control system of the present invention.

Referring now to FIG. 4, the system of the present invention 21 includes a primary flight control system (PFCS) 22, an automatic flight control system (AFCS) 24 and an integrated fire and flight control system (IFFC) 25. The PFCS receives displacement command output signals from a displacement collective stick 26 on lines 27. The AFCS also receives collective stick discrete output signals on the lines 27. The PFCS and AFCS each receive the force output command signals of a four-axis sidearm controller 29 on lines 30. The AFCS and PFCS also receive sensed parameter signals from sensors 31 on lines 32. The pilot command signals on lines 27 and 30 and the sensed parameter signals on lines 32 are shown consolidated within trunk lines 33 and 34 in the PFCS and AFCS, respectively.

The PFCS and AFCS each contain control modules for controlling the yaw, pitch, roll and lift axes of the aircraft. These modules are shown by blocks 35-38 for the PFCS and blocks 39-42 for the AFCS. The PFCS modules provide rotor command signals, and the AFCS modules provide conditioning and/or trimming of the PFCS rotor command signals. The PFCS and AFCS modules are interconnected through bus 43.

The PFCS and AFCS use a model following algorithm in each control axis to provide rotor command signals on output lines 44 to a rotor mixing function 45 which commands displacement of mechanical servos 46 and linkages 47 to control the tip path plane of a main rotor 50. Additionally, the rotor mixing function 45 controls tail rotor servos 48 which control the thrust of a tail rotor 51 through linkages 49. The sensed parameter signals from sensors 31, on lines 32, provide the PFCS and AFCS with the aircraft's angular rate and attitude response to the main rotor and tail rotor command signals. Additionally, the sensors provide information related to velocity, altitude, acceleration, etc., which information may or may not be used by the flight control system.

The IFFC 25 receives fire control data from a fire control system 55 on lines 57. The IFFC also receives sensed parameter signals on lines 32 from sensors 31. Target position data is provided to the fire control 55 from target position/angle data inputs 56 on lines 58. The target position/angle data may be provided from a variety of sources as is well-known in the art, e.g., line of sight angle sensors, map and position data, infrared sensors, laser sensors, radar sensors, etc. The fire control data on lines 57 and sensed parameter signals on lines 32 are shown consolidated within trunk lines 59 in the IFFC.

The IFFC contains control channel modules for providing yaw and pitch control signals to the AFCS. These modules are shown by blocks 60 and 61, respectively. The IFFC modules are interconnected to the PFCS and AFCS modules through the bus 43. As described in greater detail hereinafter, when the fire control solution azimuth and elevation commands are within a threshold limit, the AFCS yaw and pitch axis attitude feedback error signals are replaced with the fire control azimuth and elevation axis commands, respectively. Normally, in response to pilot commands, the AFCS provides the desired yaw and pitch attitude reference. The difference between these attitude reference commands and actual aircraft attitude is attitude feedback error signals which the AFCS continuously attempts to reduce to zero. When certain weapons are selected, e.g., a fixed forward gun or a rocket having a fixed pod, and IFFC is enabled, then the fire control azimuth and elevation commands are used as the respective attitude feedback error signals. This is referred to as the "coupled aiming" mode of operation. IFFC may be enabled by the pilot depressing a switch on the sidearm controller 29, or additional logic may be provided (FIG. 14) which requires that the target be within an engagement window and the fire control system is providing valid fire control commands.

Figure 5:
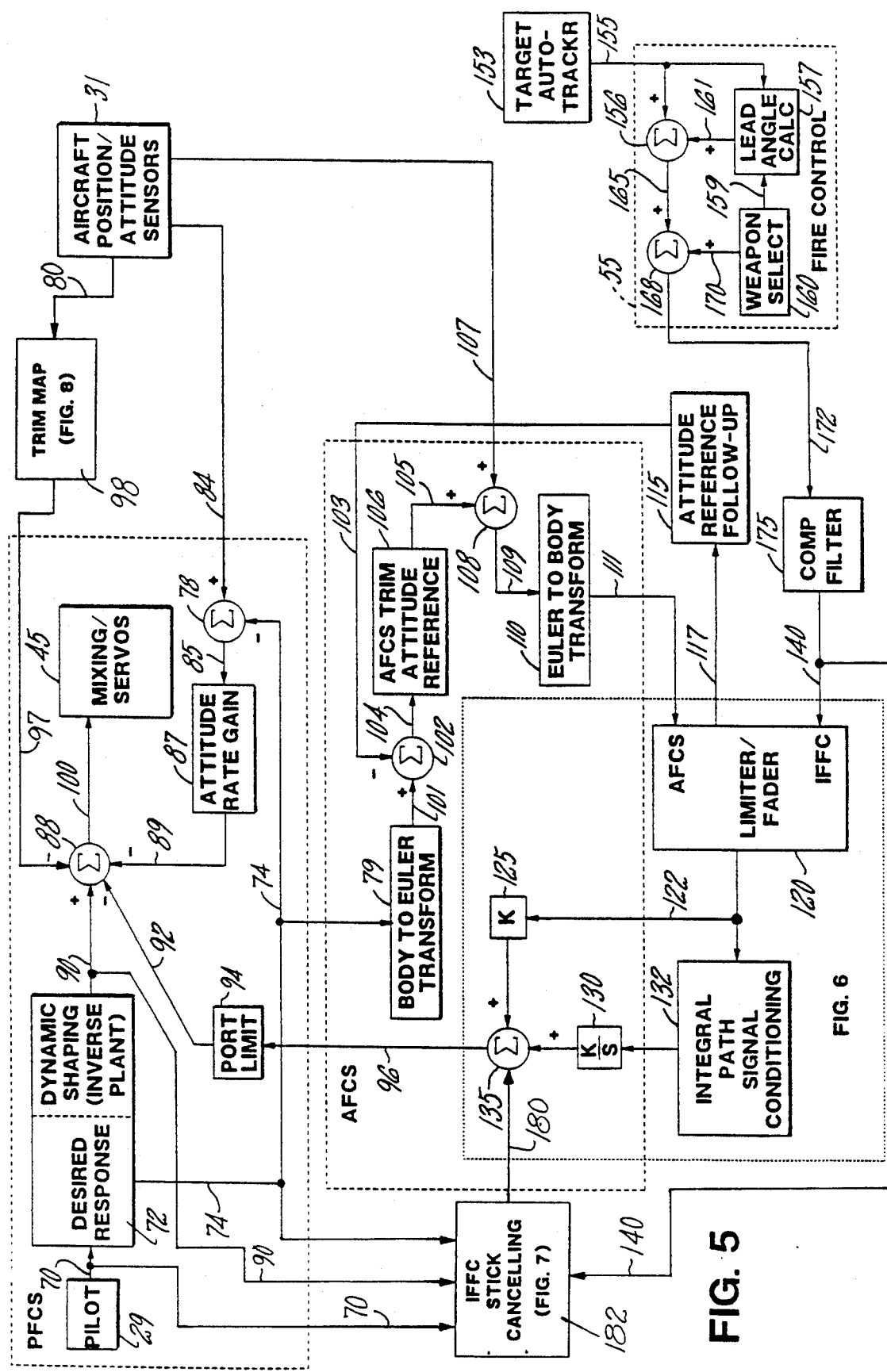
FIG. 5 is a simplified schematic block diagram of the integrated fire and flight control system of FIG. 4.

FIG. 5 illustrates the functional interconnection of the IFFC 25 with the PFCS 22 and the AFCS 24. FIG. 5 will be described with respect to the yaw axis modules 35, 39, 60, e.g., flight control yaw attitude reference and fire control azimuth command signals; however, it will be understood by those skilled in the art that the functional interconnection of FIG. 5 is equally applicable to flight control pitch attitude reference and fire control elevation command signals.

The PFCS receives a yaw axis command signal on line 70, provided through trunk lines 33 and lines 30, from the sidearm controller 29 (FIG. 4). In the present embodiment, the sidearm controller is a four-axis force stick in which yaw axis command signals are generated by the pilot's lateral twisting (left or right) of the sidearm controller, and in which pitch axis command signals are generated by the pilot's pushing and pulling (front or back) of the sidearm controller. The yaw command signal is presented to the input of signal shaping circuitry 72. The signal shaping circuitry comprises a desired rate response section that provides a commanded yaw rate signal on a line 74 indicative of the desired rate of change of the aircraft attitude about the yaw axis. Additionally, the signal shaping circuitry 72 comprises a dynamic shaping section which is an inverse model of the approximate plant yaw axis response that provides a control command signal on a line 90. The control command signal on the line 90 represents the approximate rotor command necessary to achieve the desired yaw-axis rate of change of the aircraft for each pilot commanded maneuver, and provides the primary control input to the rotor mixing function 45.

The commanded yaw rate signal on line 74 presented simultaneously to a summing junction 78 in the PFCS, and a Body to Euler Transformation 79 in the AFCS. The summing junction 78 sums the commanded yaw rate signal on line 74 (from the signal shaping circuitry 72) with the aircraft's actual yaw rate, received (from sensors 31, through lines 32 and trunk 33) as a sensed yaw rate signal on line 84. The output of the summing junction 78 is a yaw rate error signal on a line 85. The rate error signal is amplified in a rate gain stage 87 and is provided on a line 89 to one input of a second PFCS summing junction 88. The summing junction 88 also receives the control command signal on line 90 from the signal shaping circuitry 72, and a yaw command modifying signal on a line 92 from a rate and magnitude limiter 94. The limiter 94, which receives a non-limited version of the yaw command modifying signal on a line 96 (through bus 43) from the AFCS, limits the yaw command modifying signal if its magnitude and rate of change limits are exceeded. Another input to the summing junction 88 is a trim mismatch signal indicative of the amount of pilot stick input required for the aircraft to be trimmed at its current air speed and acceleration on a line 97 from a trim map function 98. The trim map function is responsive to changes in aircraft air speed, during operation in the coupled aiming mode, and its operation will be described in greater detail with respect to FIG. 8. The output of the summing junction 88 is provided on a line 100, and presented through the PFCS output trunk lines 44 to the mixing function 45.

The magnitude and rate of change of the yaw command modifying signal from the AFCS is a function of the aircraft heading error during normal operations. The yaw command modifying signal provides an aircraft attitude feedback loop around the rotor command signal. The attitude feedback loop is the second of two feedback loops around the rotor command signal; the first being a yaw rate feedback loop provided by the yaw rate error signal on line 89.

The yaw command modifying signal is a calculated value provided by a model following algorithm within the AFCS, based on the actual aircraft response to the rotor command signal. The yaw command modifying signal modifies the rotor command signal to achieve the pilot commanded yaw attitude. A more detailed description of the model following algorithms of the AFCS, and AFCS architecture, is given in commonly owned copending U.S. patent application Ser. No. 07/751,431, entitled "High Speed Turn Coordination For A Rotary Wing Aircraft", the disclosure of which is incorporated herein by reference.

A yaw attitude feedback error signal is normally used to provide the yaw command modifying signal. However, during operation of the IFFC in the coupled aiming mode, the fire control system azimuth command is used to provide the yaw command modifying signal. The attitude feedback error signal is developed in the AFCS. The commanded yaw rate signal is provided on the line 74 to the Body to Euler Transformation 79. The Transformation 79 transforms the yaw rate signal, which is in terms of aircraft body axes, to an inertial axes reference on a line 101, which is provided to a summing junction 102. The other input to the summing junction 102 is an attitude reference follow-up error signal on a line 103.

The output of the summing junction 102 is provided on a line 104 to an AFCS trim attitude reference function 106. The reference function 106 is an integral function which converts the commanded yaw rate signal (in terms of inertial axes on the line 101) to a commanded yaw attitude signal on a line 105. The commanded yaw attitude signal is provided to a summing junction 108, the other input of which is a yaw attitude signal on a line 107, provided from sensors 31, through lines 32 and trunk 34 (FIG. 4). The output of the summing junction 108 is the yaw attitude feedback error signal on a line 109 in terms of inertial axes, and is the difference between the commanded yaw attitude on the line 105 and the actual aircraft yaw attitude on the line 107. The yaw attitude feedback error signal is provided to a Euler to Body Transform 110 which transforms the yaw attitude feedback error signal from an inertial axes reference back to an aircraft body axes reference on a line 111. The operation of both Transform functions 79, 110 are described in greater detail in the aforementioned commonly owned copending U.S. patent application Ser. No. 07/751,431, the disclosure of which is incorporated herein by reference.

During operation of the system in the coupled aiming mode, the yaw attitude feedback error signal is replaced by the fire control azimuth command signal. Therefore, there will be a difference between the yaw attitude reference as indicated by the AFCS and the actual aircraft yaw attitude because the yaw attitude feedback error signal was not used to provide the yaw command modifying signal. Therefore, the attitude reference follow-up error signal is provided on the line 103 to the summing junction 102 to modify the rate signal on the line 104. The attitude rate follow-up error signal is provided by an attitude follow-up portion 115 of the IFFC. The attitude follow-up portion receives an attitude follow-up error signal on a line 117, and converts it to an attitude reference follow-up error signal.

The yaw attitude feedback error signal on the line 111 is applied to a limiter/fader portion 120 of the IFFC. During normal operations, the limiter/fader portion 120 passes the yaw attitude feedback error signal to the line 122, where the yaw attitude feedback error signal is applied via a proportional path containing a gain function 125 to a summing junction 135. The yaw attitude feedback signal is also applied to the summing junction 135 via an integral path containing a signal selection/conditioning function 132 and an integral function 130. During normal operations, the signal selection/conditioning function 132 simply provides the yaw attitude feedback error signal to the integral function 130. The output of the summing junction 135 is the yaw command modifying signal on the line 96.

During operation of the system in the coupled aiming mode, the limiter/fader portion 120 of the IFFC replaces the yaw attitude feedback error signal on the line 122 with an IFFC azimuth command signal on a line 140. Additionally, the signal selection/conditioning function 132 modifies the IFFC azimuth command signal when the couple aiming mode is enabled as described in greater detail hereinafter with respect to FIG. 6.

The IFFC azimuth command signal is provided by the aircraft fire control system. Normally, when a specific threat/enemy platform is selected as the target for use in the coupled aiming mode, target azimuth and elevation information is provide on a line 155 by a target autotracker 153, e.g., an electro-optical tracking device or a radar. The azimuth and elevation information provided by the autotracker 153 is a line of sight vector between the target and an arbitrary point on the aircraft body used for line of sight calculations, e.g., an aircraft reference axis. The line of sight vector is resolved into an elevation component and an azimuth component. The output of the autotracker function 153 is provided on the line 155 to a summing junction 156 and to a lead angle calculation function 157. The other input to the lead angle calculation function 157 is a weapons type signal on a line 159 from a weapons selection function 160. The lead angle calculation function uses the weapons type information and the autotracker information to calculate the amount of weapons offset, i.e., lead angle, based on the type of weapons selected, to impact a target having a track and velocity corresponding to the target track and position information provided from the autotracker function. The lead angle is provided on a line 161 to the summing junction 156 where it is added to the target line of sight vectors to provide a corrected azimuth command on a line 165.

The corrected azimuth command on the line 165 is applied to a summing junction 168. The other input to the summing junction 168 is a bore sight correction signal on a line 170 from the weapons selection function 160. The bore sight correction signal is indicative of the offset between the selected weapon and the aircraft reference axis. The output of the summing junction 168 is an azimuth command which is the azimuth component of an aiming line of sight. The aiming line of sight is indicative of the weapon trajectory determined by the fire control for the weapon to successfully impact the target. The azimuth command is applied on a line 172 to a complementary filter function 175. The complementary filter may be of any suitable type known in the art for allowing aircraft body rate frequency band width to remain high while lowering aircraft body rate response to noise from the fire control path. The output of the complementary filter is the IFFC azimuth command signal on the line 140.

It will therefore be understood by those skilled in the art that the IFFC coupled aiming function uses the AFCS attitude hold signal path, which is normally provided with a yaw attitude feedback error signal. The normal attitude hold function is engaged prior to initiation of IFFC coupled aiming. After initiation of IFFC coupled aiming, the normal attitude feedback path for the yaw axis is modified by replacing the yaw attitude feedback error signal with the IFFC azimuth command signal. Since the fire control azimuth command signal is essentially the same signal that would otherwise be commanding a gun turret angle, the fire control solution is satisfied when the fire control command signal is zero, i.e., a turreted gun would be commanded to exactly align with the airframe. This assumes that the target line of sight is combined with the proper lead angle, including ballistics, target and ownship states, by the fire control function. Additionally, the fire control solution is assumed to account for the weapon bore sight alignment with respect to the airframe and autotracker.

During engagement of IFFC coupled aiming, an additional input to the summing junction 135 is a pilot stick cancelling signal on a line 180 from an IFFC stick cancelling function 182. The stick cancelling function 182 is responsive to the following inputs: the yaw axis command signal on the line 70, the control command signal on the line 90, the commanded yaw rate signal on the line 74, and the IFFC azimuth command signal on the line 140. The cancelling function, as described in greater detail hereinafter with respect to FIG. 7, makes the IFFC less responsive to small stick inputs during operation in the coupled aiming mode, to prevent inadvertent and small stick inputs from altering the aircraft heading from the commanded fire control azimuth and elevation command input. The stick cancelling function is in no way intended to degrade authority of intentional pilot stick inputs. It merely cancels out small, inadvertent signals that would degrade the firing attitude.

Figure 6:
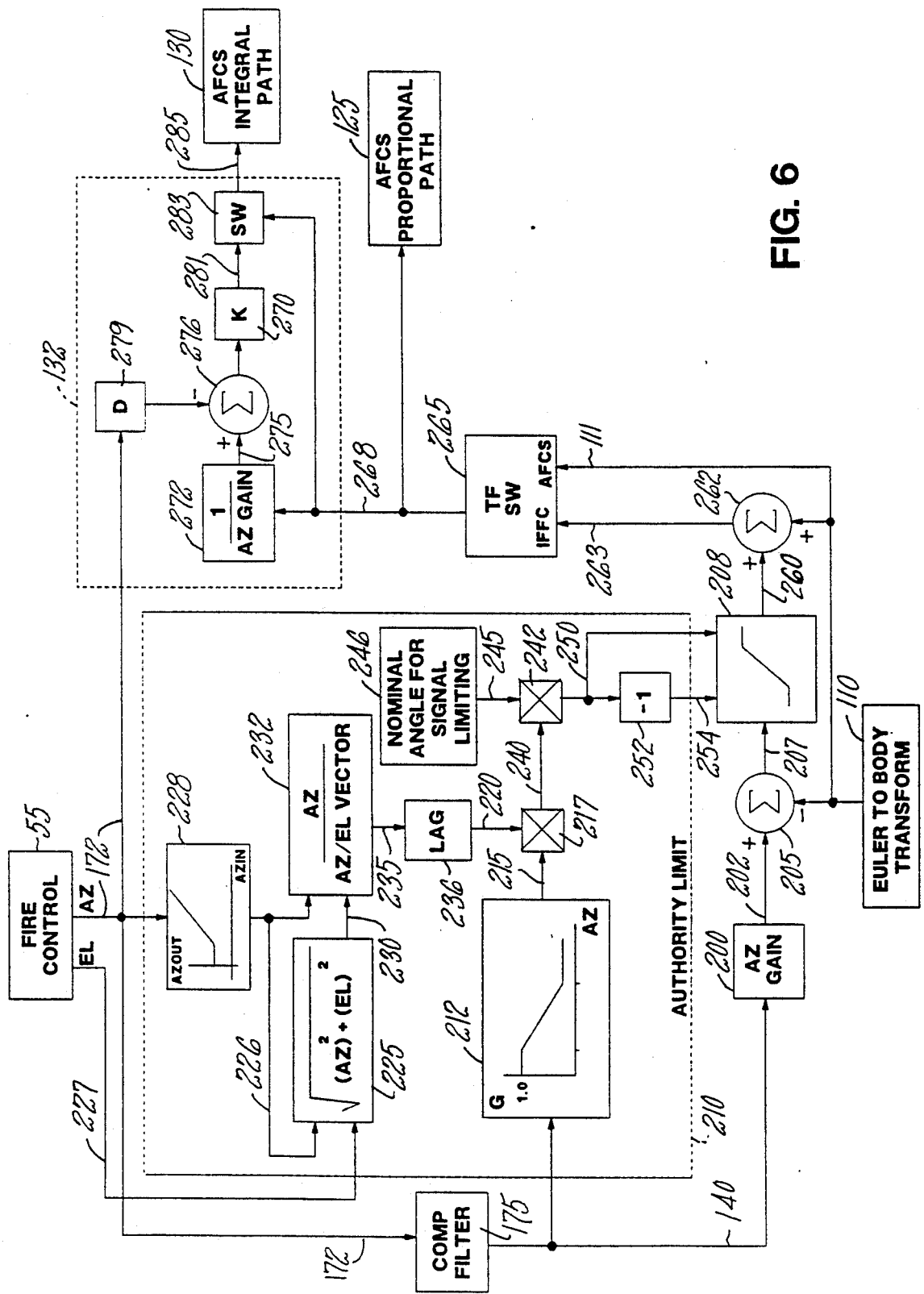
FIG. 6 is a schematic block diagram of an enable portion of the integrated fire and flight control system of FIG. 5.

Referring now to FIG. 6, the function of the limiter/fader portion 120 of the IFFC is to fade-in the fire control azimuth and elevation commands in place of the yaw and pitch attitude feedback error signals when IFFC coupled aiming is enabled. FIG. 6 will also be described with respect to yaw and azimuth signals; however, it is equally applicable to pitch and elevation signals as will be obvious to those skilled in the art. As described hereinbefore with respect to FIG. 5, a fire control azimuth command signal is provided on a line 172 from the fire control system 55. The fire control azimuth command is provided to the complementary filter 175, the output of which is an IFFC azimuth command signal on a line 140. The azimuth command signal is applied to a gain function 200, the output of which is provided on a line 202 to a summing junction 205. The gain function 200 is used to set the IFFC response for small errors without affecting the normal AFCS attitude gain value. It may be desirable to provide the IFFC with a larger gain for small errors to make the aircraft attitude more responsive to fire control azimuth commands, so that the aircraft rapidly assumes and maintains the correct firing attitude.

The other input to the summing junction 205 is the yaw attitude feedback error signal on the line 111, from the output of the Euler to Body Transform 110 (FIG. 5). The output of the summing junction 205 is an IFFC attitude error signal on a line 207, which is applied to a limiter function 208. The magnitude of the IFFC attitude error signal is the change in attitude commanded by the fire control azimuth command from the pilot's commanded yaw attitude. The upper and lower limits of the limit function 208 are determined in an authority limit portion 210 of the IFFC. It will be noted that for larger azimuth commands on the line 140, the value of the gain 200 will change the value of the fire control azimuth command on the line 140 at which the limiter function 208 acts. For example, if the limiter upper limit is 6 degrees and the gain function has a value of 2, the limiter function upper limit is 3 degrees with respect to the fire control azimuth command. However, the limiter still acts at six degrees with respect to the change in attitude indicated by the attitude feedback error signal on the line 111.

A gain function 212 of the authority limit portion 210 receives the IFFC azimuth command on the line 140. The magnitude of the gain provided by the gain function 212 is dependent upon the magnitude of the IFFC azimuth command. As described hereinbefore, the magnitude of the IFFC azimuth command decreases as the aircraft attitude gets closer to the fire control firing solution, and is equal to zero when the aircraft attitude is pointing at the firing solution. Therefore, for small IFFC azimuth command signals, e.g., less than 6 degrees, the output of the gain function 212 is its maximum value of one. As the magnitude of the azimuth error signal increases, the magnitude of the gain function decreases, until the gain function reaches its minimum value, e.g., 0.25, at an upper IFFC azimuth command limit, e.g., 20 degrees.

The output of the gain function 212 is provided on a line 215 to a multiplication function 217 which multiplies the gain on the line 215 by an AZ/EL magnitude ratio on a line 220. The magnitude ratio is determined by applying the fire control solution azimuth and elevation commands to a vector function block 225 on the lines 226 and 227, respectively. The azimuth command is provided via limiter function 228 which limits the minimum value of the azimuth command, e.g., 6 degrees. The vector output of the function block 225 is provided on a line 230 as the denominator of a function block 232. The numerator of the function block 232 is the limited fire control azimuth command on the line 226. The output of the function block 232 is a ratio of the fire control solution azimuth command to the fire control solution vector. The ratio is provided on a line 235 to a lag filter 236, the output of which is the magnitude ratio on the line 220. This ratio adjusts the rate of closure of the fire control solution in the yaw axis according to the ratio of the yaw axis portion of the total aiming error so that the closure in both the pitch and yaw axis is achieved in a coordinated manner.

The output of the multiplication function 217 is provided on a line 240 to a second multiplication function 242. The other input to the multiplication function 242 is a nominal angle signal on a line 245 provided by a nominal angle for signal limiting function 246. The nominal angle signal limits the magnitude of the limit function 208 upper and lower limits if the output of the gain function 212 and the magnitude ratio are at their maximum values of one. The output of the second multiplication function 242 is provided on a line 250 to the limiter function 208 to determine the limiter function upper limit, and is provided to a multiplier 252 having a value of negative one, the output of which is the limiter function 208 lower limit on a line 254.

It will therefore be understood that the upper and lower limits of the limiter function 208 are dependent upon the magnitude of the azimuth command, as determined in the gain function 212, and the relative magnitude of the azimuth command with respect to the firing command vector, as determined in the magnitude ratio function 232. As described hereinbefore, the IFFC attitude error signal is provided on the line 207 to the limiter function 208 to thereby limit its magnitude. The output of the limiter function 208 is provided on a line 260 to a summing junction 262. The other input to the summing junction 262 is the yaw attitude feedback error signal on the line 111.

The output of the summing junction 262 is an IFFC azimuth command signal on a line 263, the magnitude of which is limited with respect to the change it can command from the pilot's commanded attitude. If the difference between the IFFC azimuth command signal and the AFCS attitude feedback error signal is large, the limiter function 208 limits the magnitude of that difference to limit the effect of the IFFC attitude command signal on the aircraft attitude.

The magnitude limited IFFC azimuth command signal on the line 263, and the AFCS attitude feedback error signal on the line 111, are applied to a transient free switch 265. The transient free switch 265 is controlled by a pilot engageable switch, located for example on the sidearm controller 29 (FIG. 4). The output of the transient free switch is the AFCS attitude feedback error signal when the pilot is not depressing the side arm controller switch, and the output of which is the IFFC magnitude limited azimuth command signal when the pilot is engaging the side arm controller switch. Therefore, the IFFC coupled aiming mode will only be enabled when the pilot is manually engaging the transient free switch 265. If at any time during operation in the coupled aiming mode the pilot releases the switch, the system will return to normal operation.

The output of the transient free switch is provided on a line 268 to the gain function 125 in the AFCS proportional path (FIG. 5). The output of the transient free switch 265 is also provided on the line 268 to the integrator 130 in the AFCS integral path via the signal selection/conditioning function 132. It is desirable to provide a high gain in the integral path during operation in the coupled aiming mode so that the attitude of the aircraft will rapidly assume the targeting solution. The increased integral gain is provided in a gain function block 270. The IFFC azimuth command signal is provided to the integral path via gain function 272 which divides the signal by the proportional path azimuth gain. Therefore, the value of the signal is returned to a unity scale of fire control angle error for ease of understanding the operation of the integral path function. The output of the gain function 272 is provided on a line 275 to a summing junction 276. The other input to the summing junction 276 is the fire control azimuth command rate on a line 278 provided as the output of a differentiating function 279 which differentiates the fire control azimuth command on the line 172. The fire control azimuth command rate is provided to the summing junction 276 as an error damping signal to damp out over controlled integrator response caused by using the large gain in gain function 270. The output of the gain function 270 is provided on a line 281 to a switch 283. The other input to the switch 283 is the output of the transient free switch 265 on the line 268. The switch 283 is responsive to the activation of the transient free switch. During normal operations, the switch provides the attitude feedback error signal on the line 268 directly to the AFCS integral path on line 285. During operations in the coupled aiming mode, the switch provides the IFFC azimuth command signal on the line 281 to the AFCS integral path on line 285.

Figure 7:
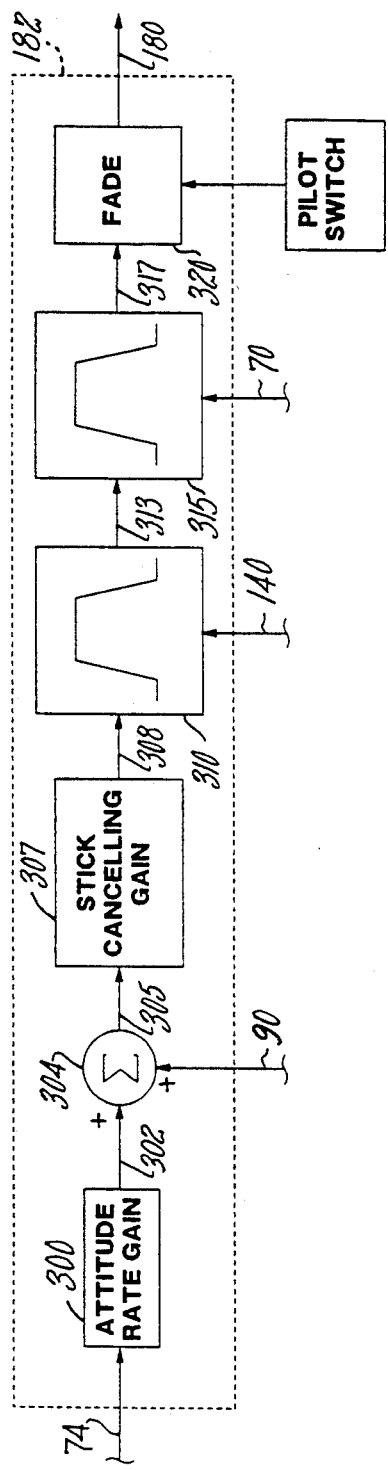
FIG. 7 is a schematic block diagram of a pilot stick command cancelling portion of the integrated fire and flight control system of FIG. 5.

As described hereinbefore, during operation in the IFFC coupled aiming mode, the gain of the integral path is increased to make the aircraft attitude more responsive to fire control azimuth commands, so that the aircraft rapidly assumes the correct firing attitude. Once the aircraft has assumed the proper attitude for weapons launch, small changes in the aircraft attitude with respect to the firing solution will reduce the accuracy of weapons delivery. Therefore, the stick cancelling function illustrated in FIG. 7 is provided to cancel the effects of small inadvertent stick movements on the heading attitude of the aircraft. It is important to note that the stick cancelling function is only intended to cancel small inadvertent stick movements to maintain the proper firing attitude, and is not intended to inhibit intended pilot commanded variations in aircraft attitude.

Referring to FIG. 7, the commanded yaw rate signal on the line 74 is provided to a rate gain stage 300 corresponding to the rate gain stage 87 (FIG. 5) in the yaw error feedback loop. The output of the rate gain stage 300 on a line 302 is that portion of the yaw rate error signal attributable to a pilot stick input. This signal is provided to a summing junction 304. The other input to the summing junction 304 is the control command signal on the line 90. The output of the summing junction 304, on a line 305, is equivalent to the PFCS rotor command on the line 100 (FIG. 5) attributable to pilot stick input. The stick input signal on the line 305 is provided to a stick cancelling gain function 307 which limits the authority of the stick cancelling function, i.e., the magnitude is less than one. The output of the stick cancelling gain function 307 is provided on a line 308 to a gain function 310.

The magnitude of the gain function 310 is dependent upon the fire control azimuth/elevation command on the line 140. When the fire control azimuth command is equal to zero, indicating that the aircraft attitude is exactly equal to the firing solution, the maximum magnitude of the gain function 310 is one. However, as the magnitude of the fire control command on the line 140 increases, indicating that the aircraft attitude is not equal to the fire control solution, the maximum magnitude of the gain function 310 decreases.

The output of the gain function 310 is provided on a line 313 to a second gain function 315. The magnitude of the gain function 315 is dependent upon the magnitude of the yaw axis command signal on the line 70. When the magnitude of the yaw axis command signal is small, indicating that the pilot commanded yaw input is small, the maximum magnitude of the gain function 315 is one. However, as the magnitude of the yaw axis command on the line 70 increases, indicating that the pilot is intentionally inputting a yaw axis command, the maximum magnitude of the gain function 315 rapidly decreases to zero. Therefore, small or inadvertent stick movements will have no effect on the cancelling function. However, when the pilot intentionally inputs a yaw axis command, the stick cancelling signal is rapidly removed by the gain function 315.

The output of the gain function 315 is provided on a line 317 to a fader 320. The fader 320 is responsive to system operating in the coupled aiming mode, indicated for example by the pilot actuating the switch on the sidearm controller. When the switch is not engaged by the pilot, indicating that the coupled aiming mode is not engaged, the output of the fader is zero on the line 180. However, when the pilot depresses the switch, the fader fades in the signal on the line 317 to the line 180.

During operation in the coupled aiming mode, the fire control solution may cause the helicopter to assume a positive pitch or a negative pitch, thereby causing the helicopter to decelerate or accelerate, respectively. Because the pilot has not changed the position of the stick 29 (FIG. 4) there will be a mismatch between actual air speed and the reference air speed corresponding to the actual stick position. Therefore, the air speed trim map function of FIG. 8 is provided to modify the reference pilot stick air speed during operation in the IFFC coupled aiming mode.

Figure 8:
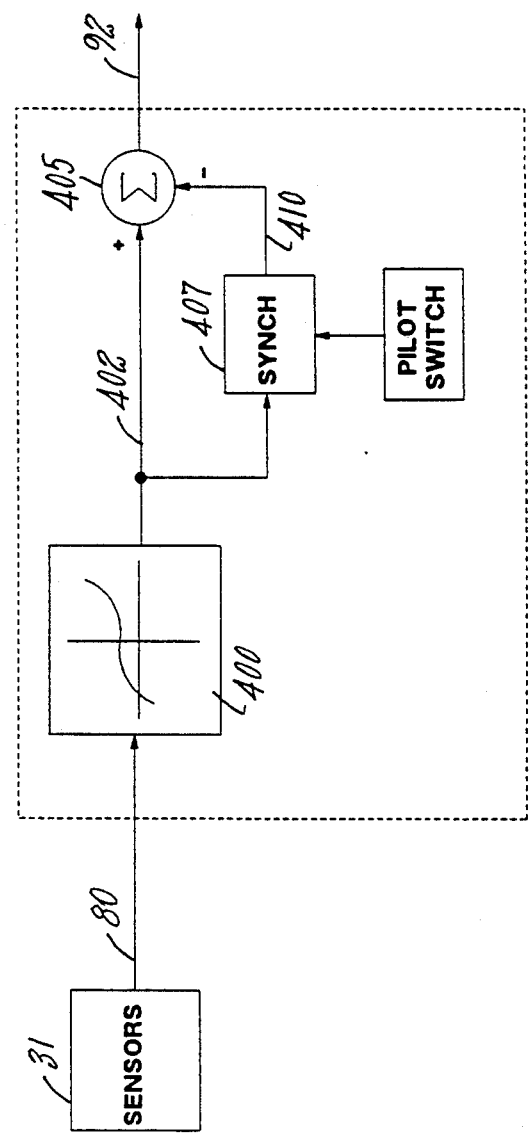
FIG. 8 is a schematic block diagram of a trim map portion of the integrated fire and flight control system of FIG. 5.

Referring to FIG. 8, the aircraft forward air speed is provided on the line 80 to an air speed trim map function 400. The trim map function provides an output on a line 402 to a summing junction 405 to reduce the mismatch between actual stick position corresponding to its position at the initial trim value, and the stick position required at each value of air speed during operation in the coupled aiming mode. The output of the trim map function 400 is also provided to a synchronization function 407. During normal operation, the synchronization function simply passes the input signal on line 402 to the summing junction 405 on line 410. However, during operation in the coupled aiming mode, the synchronization function fixes the output on line 410 equal to the value of the input at the instant coupled aiming is engaged. Thereafter, when the coupled aiming mode is disengaged, the synchronization function fades the signal on line 410 to equal the value of the input signal on line 402.

It will therefore be understood that during normal operations, the output of the summing junction 405 is zero on the line 92. Once coupled aiming mode is engaged, the output of the summing junction 405 is equal to the difference between the trim value just prior to engagement of coupled aiming and the trim value corresponding to the mismatch caused by the fire control command input. The mismatch signal on the line 97 is provided to the summing junction 88 (FIG. 5). The mismatch results because as the aircraft attitude is commanded to change significantly to satisfy the fire control solution, the aircraft is placed in an accelerating or decelerating condition, thereby causing air speed to change. It is known that for small changes in air speed near hover, large changes in stick trim may be used, particularly if the rotor downwash is changing over a horizontal stabilizer surface. This approach of providing the trim stick verses air speed can be termed a "feed forward" trim command function, and it ideally neutralizes the aircraft trim stability in that the stick trim requirement is continuously provided at all air speeds.

Since these trim changes may occur over changes in air speed of 5 to 10 knots, the method of determining air speed may be difficult. One way of improving speed change measurement is to use an acceleration sensor, corrected for axis alignment and gravitational force, that is integrated to form an approximation of the change in speed. This value can then be slaved in the long-term to the sensed air speed or ground speed data.

Although not shown in the trim map function, it may be desirable to provide a second trim signal as a function of aircraft acceleration. The pitch commanded to achieve the proper firing solution in the coupled aiming mode will cause the aircraft to accelerate or decelerate, thereby causing a change in air speed. The trim signal provided by the air speed function only accounts for a portion of the stick mismatch. It is anticipated that the additional mismatch component attributable to acceleration may be accounted for by providing a trim signal as a function of acceleration.

The integrated fire and flight control system described herein with respect to FIGS. 4 through 8 may be implemented using software which performs the coupled aiming function in accordance with the present invention, in a flight control in which the calculations are determined digitally, such as the PFCS 22, the AFCS 24 and the IFFC 25 shown in FIG. 4. The integrated fire and flight control system may be encompassed within a digital automatic flight control system employing a known microprocessor (UPROC) for executing the algorithmic subroutines of FIGS. 9, 10, 11 and 12, as described hereinafter.

Figure 9:
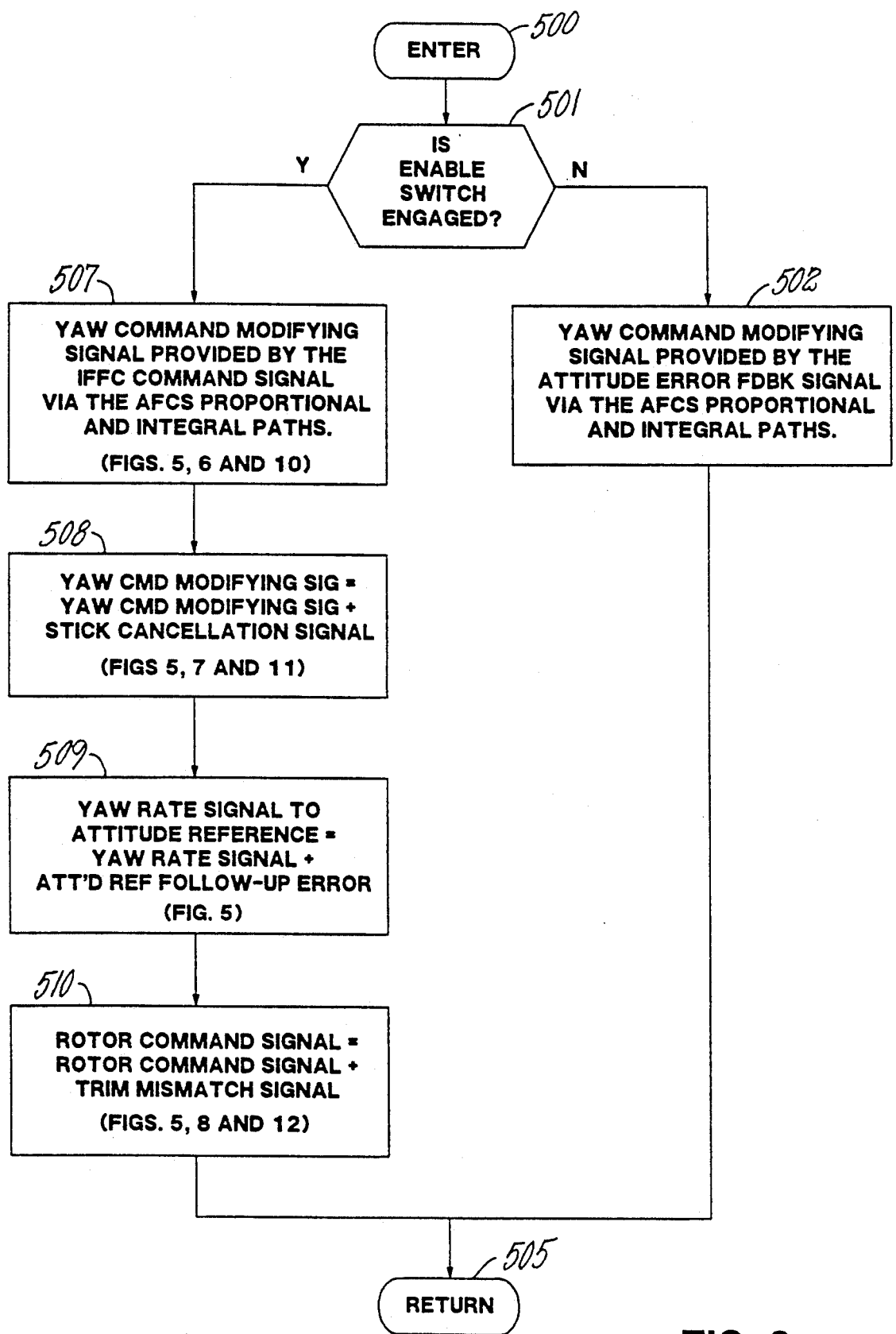
FIG. 9 is a simplified logic flow diagram of a routine for providing integrated fire and flight control of the present invention.

Referring now to FIG. 9, a coupled aiming routine is entered in a step 500, and the UPROC performs a first test 501 to determine whether the pilot has engaged the coupled aiming enable switch. If the results of the tests 501 are negative, coupled aiming is not enabled, and the UPROC performs a step 502 wherein the yaw command modifying signal is provided by the attitude feedback error signal via the AFCS proportional and integral paths. The subroutine then returns in the step 505.

If the results of the test 501 are positive, the coupled aiming mode is enabled, and the UPROC consecutively performs steps 507 through 510. In the step 507, the yaw command modifying signal is provided by the IFFC command signal via the AFCS proportional and integral paths. The IFFC command signal is determined in the algorithmic subroutine of FIG. 10, which will be described hereinafter. In step 508, the UPROC performs the subroutine of FIG. 11, wherein a stick cancellation signal is added to the yaw command modifying signal. In step 509, the UPROC modifies the yaw rate signal provided to the AFCS attitude reference by adding an attitude reference follow-up error signal. Finally, in step 510, the UPROC performs the subroutine of FIG. 12 wherein a trim mismatch signal is added to the rotor command signal. The routine then returns in the step 505.

Figure 10:
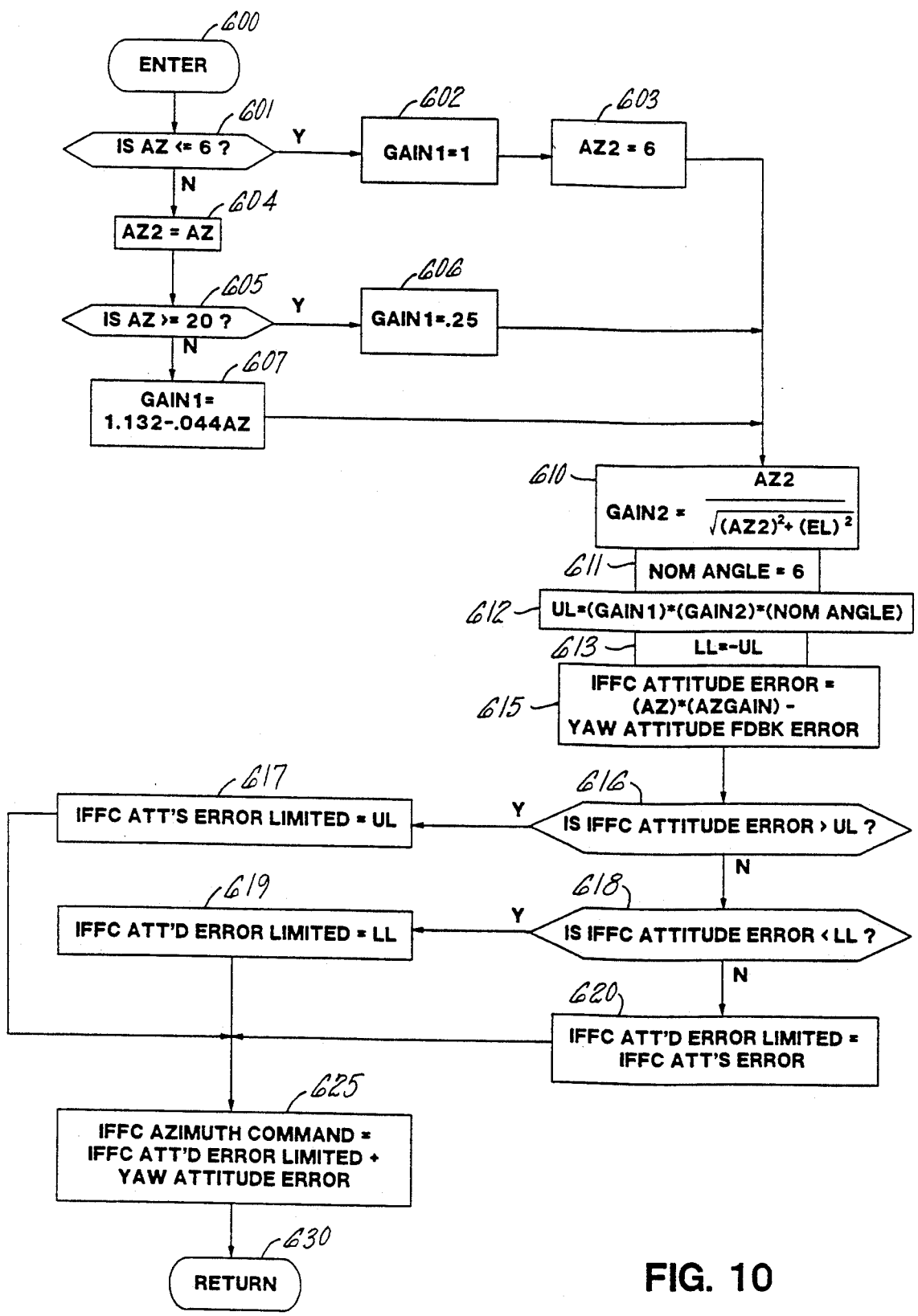
FIG. 10 is a simplified logic flow diagram of a subroutine for determining an IFFC azimuth command signal for use in the routine of FIG. 9.

The magnitude of the IFFC azimuth command signal is determined in the subroutine of FIG. 10. The subroutine is entered in a step 600, and the UPROC performs steps and tests 601 through 607 to determine the magnitude of a first gain (GAIN1) and to determine the minimum magnitude of the fire control azimuth command (AZ) which will be used for determining a second gain (GAIN2) in a step 610. First, the UPROC performs a test 601 to determine if the magnitude of AZ is less than or equal to 6. If the results of the test 601 are positive, the UPROC consecutively performs steps 602 and 603 wherein GAIN1 is set equal to 1, and an azimuth signal used for calculating GAIN2 (AZ2) is set equal to 6. If the results of the test 601 are negative, the UPROC performs a step 604 in which AZ2 is set equal to AZ. Next, the UPROC checks if AZ is greater than or equal to 20 in a test 605. If the results of the test 605 are positive, GAIN1 is set equal to 0.25 is a step 606. If the results of the test 605 are negative, GAIN1 is determined in a step 607 using equation 1 below:

$$GAIN1 = 1.132 - 0.044\,AZ \qquad (Equation\ 1)$$

Values selected for GAIN1 in the steps 602, 606 and 607 are illustrative only, and may be changed to provide the desired response.

Next, the UPROC determines the value of GAIN2 in a step 610 as the ratio of AZ2 to a fire control solution vector which uses AZ2 for determining the vector. An upper limit (UL) and a lower limit (LL) for limiting the magnitude of an IFFC attitude error signal are determined in steps 611 through 613. In step 611, a nominal angle for signal limiting (NOM ANGLE) is set equal to 6 degrees. Next, the UPROC determines the upper limit as the product of GAIN1, GAIN2 and the nominal angle in a step 612. The UPROC sets the lower limit as the negative of the upper limit in a step 613. The UPROC then determines the IFFC attitude error signal as the difference between the AZ multiplied by an azimuth gain (AZGAIN) and the yaw attitude feedback error.

Next, the UPROC performs the steps 616 through 620 for limiting the magnitude of the IFFC attitude error signal. The UPROC first checks if the IFFC attitude error signal is greater than the upper limit in a test 616. If the results of the test 616 are positive, an IFFC attitude error limited signal is set equal to the upper limit in a step 617. If the results of the test 616 are negative, the UPROC checks if the IFFC attitude error signal is less than the lower limit in a test 618. If the results of the test 618 are positive, the IFFC attitude error limited signal is set equal to the lower limit in a step 619. If the results of the test 618 are negative, the IFFC attitude error limited signal is set equal to the IFFC attitude error signal in a step 620. The UPROC then determines the IFFC azimuth command signal as the sum of the IFFC attitude error limited signal and the yaw attitude feedback error signal in a step 625. The subroutine then returns in the step 630.

Figure 11:
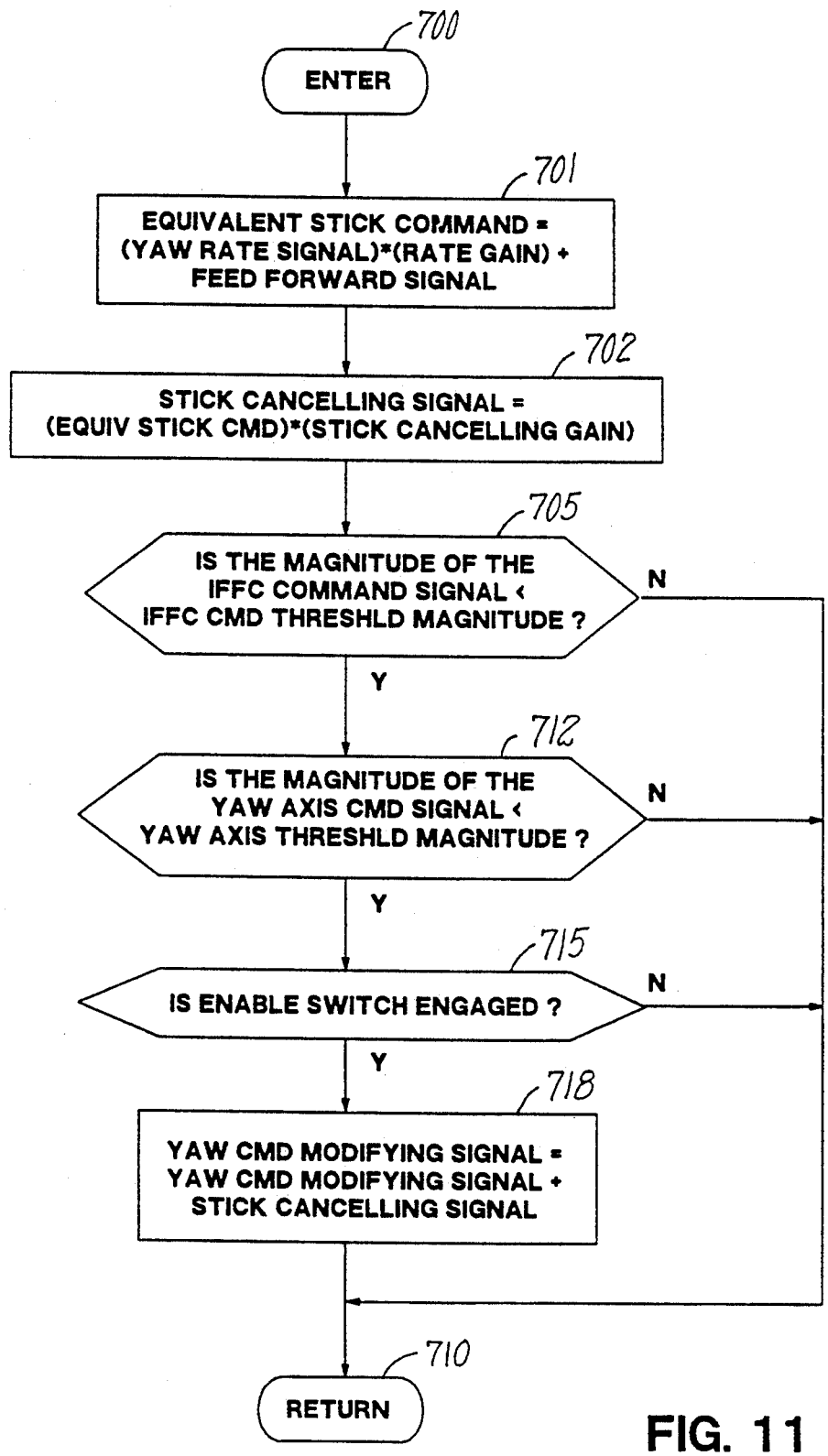
FIG. 11 is a simplified logic flow diagram of a subroutine for modifying a yaw command modifying signal with a stick cancelling signal during operation in an IFFC coupled aiming mode.

The stick cancelling signal is determined in the subroutine of FIG. 11. The subroutine is entered in a step 700, and an equivalent stick command signal is determined as the sum of the yaw rate signal times the attitude rate gain and the control command signal. The yaw rate signal times the attitude rate gain is that portion of the yaw rate error signal attributable to a pilot stick input. The equivalent stick command is that portion of the PFCS rotor command attributable to pilot stick input. Next, the UPROC determines a stick cancelling signal as the product of the equivalent stick command signal and the stick cancelling gain in a step 202.

The UPROC next performs the steps 705 and 712 to determine if the stick cancelling signal should be added to the yaw command modifying signal. The tests 705 and 712 correspond to the function blocks 310 and 315 (FIG. 7) respectively. However, the equivalent gain function which would be used to represent the tests 705 and 712 would be an ON/OFF or step gain function as opposed to the gain functions shown in function blocks 310 and 315. In the test 705, the UPROC checks if the magnitude of the IFFC command signal is less than a threshold magnitude. If the results of a test 705 are negative, the subroutine returns in the step 710. Therefore, the stick cancelling signal would effectively be set equal to zero. If the results of the test 705 are positive, the UPROC checks if the magnitude of the yaw axis command signal is less than a threshold magnitude in the test 712. Again, if the results of the test 712 are negative, the subroutine returns in the step 710. However, if the results of this test 712 are positive, the UPROC checks if the coupled aiming mode is engaged in a step 715. If the pilot has not depressed the enable switch, the results of this test 715 are negative, and the subroutine returns in the step 710. If the results of the test 717 are positive, then the stick cancelling signal is added to the yaw command modifying signal in the step 718. The subroutine then returns in the step 710.

Figure 12:
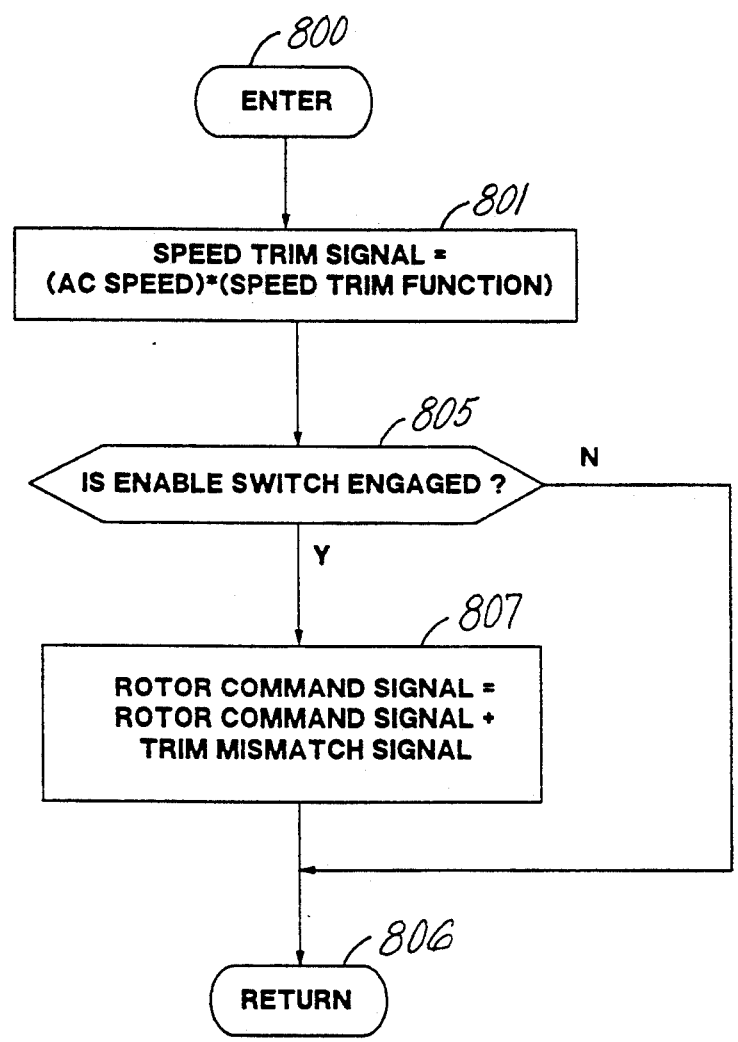
FIG. 12 is a simplified logic flow diagram of a subroutine for modifying a rotor command signal with a trim mismatch signal during operation in the IFFC coupled aiming mode.

The trim mismatch signal, used to account for the mismatch between actual air speed and the reference air speed corresponding to the trim stick position during operation in the coupled aiming mode, is determined in the subroutine of FIG. 12. The routine is entered in a step 800, and the UPROC determines a speed trim signal as the product of the aircraft speed and a speed trim function in a step 801. The step 801 correspond to the air speed signal on the line 80 applied to function 400 (FIG. 8). Next, the UPROC checks if the coupled aiming mode is engaged in a test 805. If the pilot has not depressed the enable switch, the results of the test 805 are negative, and the subroutine returns in a step 806. However, if the results of the test 805 are positive, the trim mismatch signal is added to the rotor command signal in the step 807. The subroutine then returns in the step 806.

Figure 13:
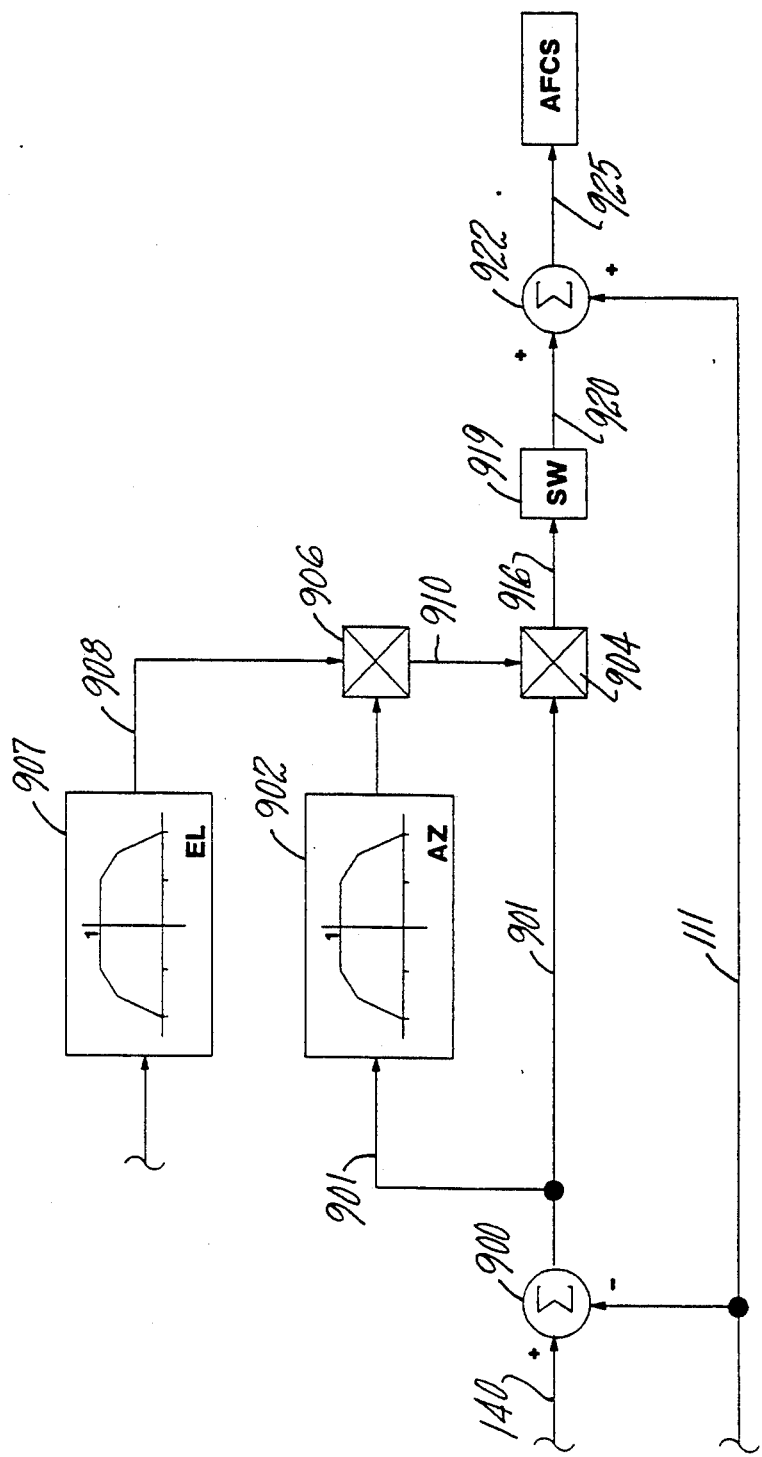
FIG. 13 is an alternative embodiment of the enable portion of the integrated fire and flight control system shown in FIG. 6 for providing an IFFC azimuth command signal.

The IFFC azimuth command signal used for providing the yaw command modifying signal (on line 96 of FIG. 5) is determined using the complex control of FIG. 6 (the equivalent of which is shown in the subroutine of FIG. 10). However, the invention will work equally as well with a more simplified control, such as the one illustrated in FIG. 13. Referring to FIG. 13, the fire control azimuth command signal is provided on the line 140 to a summing junction 900. The other input to the summing junction 900 is the yaw attitude feedback error signal on the line. The output of the summing junction 900 is a fire control azimuth error signal on a line 901, and is simultaneously applied to a gain function 902 and a multiplier 904. The magnitude of the gain provided by the gain function 902 is dependent upon the magnitude of the fire control azimuth error signal. When the aircraft attitude is close to the attitude corresponding to the fire control solution, the magnitude of the fire control azimuth error signal is small, and the output of the gain function 902 is its maximum value, i.e., one. As the magnitude of the fire control azimuth error signal increases beyond a threshold value, e.g., 6 degrees, the output of the gain function rapidly falls off to zero. If desired, the gain function characteristic may be provided with hysteresis near the threshold regions.

The output of the gain function is provided on a line 905 to a multiplier 906 where it is multiplied by the output of gain function 907 on line 908. The gain function 907 has similar characteristics to gain function 902 except that it is responsive to the fire control elevation signal rather than the azimuth signal. The output of the multiplier 906 is a composite gain based on the magnitude of the fire control azimuth and elevation signals. If either signal is above the threshold value, the output of gain function 906 is zero. By combining these gains in this way, a window of azimuth and elevation is created in which the fire control solution must exist or the IFFC azimuth and elevation command signals will have no authority.

The output of the gain function 906 is provided on a line 910 to the summing junction 904 where it is multiplied by the fire control azimuth error signal. The output of the multiplier is an IFFC increment signal, and is provided on a line 916 to a switch 919. The switch may be a transient free switch of the type described herein with respect to FIG. 6, or any other suitable switch for controlling the engagement and disengagement of the coupled aiming mode. When the switch is open, the coupled aiming mode is disabled, and the yaw attitude feedback error signal is used to provide the yaw command modifying signal via the AFCS integral and proportional paths. However, when the switch 919 is closed, the coupled aiming mode is enabled, and the IFFC increment signal is provided on a line 920 to a summing junction 922 where it is summed with the yaw command modifying signal on the line 111. Therefore, when the coupled aiming mode is engaged the output of the summing junction 922 is the IFFC azimuth command signal determined as the sum of the IFFC increment signal and the yaw attitude feedback error signal. When the coupled aiming mode is not engaged, the output of the summing junction 922 is the yaw attitude feedback error signal.

Figure 14:
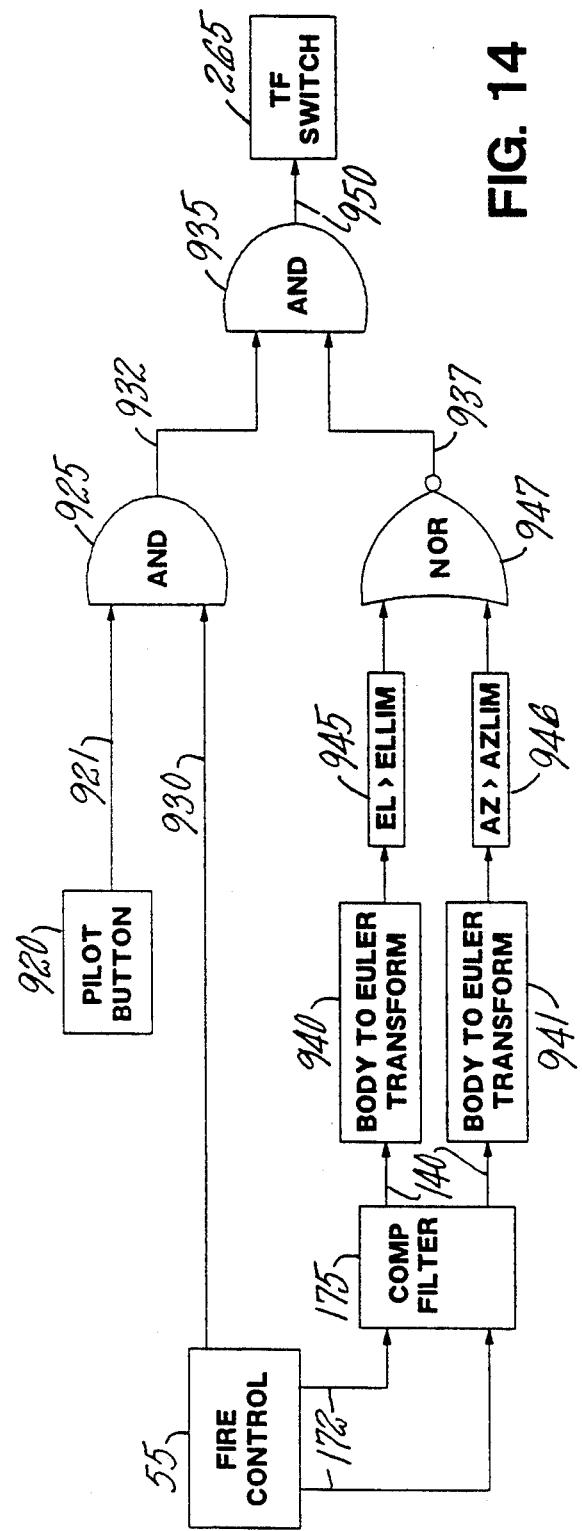
FIG. 14 is a schematic block diagram of control logic for controlling the operation of a yaw and pitch transient free switch.

The transient free switch 265 (FIG. 6) is described as being activated in response to the pilot depressing a switch or button on the sidearm controller 29 (FIG. 4). However, it may be desirable to prohibit operation in the coupled aiming mode unless certain other requirements are met. An example of a more complex control for the transient free switch 265 is shown in FIG. 14. When the button 920 on the pilot's sidearm controller is depressed, a signal is provided on a line 921 to AND gate 925. The other input to the AND gate 925 is a valid fire control signal on a line 930 from the fire control 55. The valid fire control signal is indicative of the fire control system being activated, a weapon being selected of the type requiring yaw and/or pitch attitude control for targeting, e.g., a fixed forward gun, and a target being tracked by the fire control sensors. If both conditions are met, i.e., the pilot depresses the button 920 and the valid fire control signal is present, then the AND gate provides a signal on a line 932 to a second AND gate 935.

The other input to the AND gate 935 is an AZ/EL within limits signal on a line 937. The AZ/EL within limits signal is indicative of the magnitude of both the fire control azimuth and elevation signals (in an inertial reference) being below respective threshold limits. The fire control elevation command is provided via the complementary filter 175 to a Body to Euler Transform 940. Similarly, the fire control azimuth command is provided via the complementary filter 175 to a Body to Euler Transform 941. The Transforms 940,941 convert the fire control signals from a body axes reference to an inertial axes reference. Next, the fire control signals are provided to function 945,946 which determine if the magnitude of the fire control elevation and azimuth commands are greater than respective threshold limits. If both the azimuth and elevation commands are below the respective threshold limits, NOR gate 947 provides a signal on the line 937 to the AND gate 935. If all of the conditions are met, AND gate 935 provides a signal on a line 950 to activate the transient free switch 265.

The invention is described as controlling both yaw and pitch during operation in the coupled aiming mode. However, the invention will work equally as well in an aircraft having rockets articulated in elevation and not in azimuth, or a gun turreted in elevation and not in azimuth. In such a case, the fire control system elevation command is used to control the elevation of either the turreted gun or rocket, and the integrated fire and flight control system is only used to control aircraft azimuth when operating in the coupled aiming mode. Similarly, if the aircraft is provided with a gun turreted only in azimuth or rockets articulated in azimuth and not in elevation, the fire control command is used to control the gun or rocket azimuth, and the integrated fire and flight system controls only aircraft pitch using the fire control elevation command during operation in the coupled aiming mode. In either case, the principles of the present invention can be used to control aircraft yaw attitude and pitch attitude as required for targeting.

The invention is described as being performed in a flight control system in which calculations are determined digitally, as for example in a digital automatic flight control employing a known microprocessor for performing the algorithmic subroutines of the invention. However, the invention may also be accomplished by dedicated digital hardware or by analog hardware if desired. In such case, it may be implemented in a different fashion from that disclosed herein in accordance with the general equivalence between software as shown herein and dedicated digital hardware and software, all as is well-known to those skilled in the art. Additionally, any cycle times, gains, counts, and the like contained herein may of course be adjusted to suit any implementation and utilization of the invention.

Although the invention has been shown and described with respect to exemplary embodiments thereof, it should be understood by those skilled in the art that the foregoing and other changes, omissions and additions may be made therein and thereto without departing from the spirit and scope of the present invention.

We claim:

1. An aircraft flight control system for providing control surface command signals to the aircraft control surfaces thereby controlling the yaw, pitch, roll and lift attitude axes of the aircraft in flight, comprising:

fire control means for providing an azimuth command signal and an elevation command signal respectively indicative of the change in aircraft yaw attitude and pitch attitude for an aircraft reference axis to be aligned with an aiming line of sight, said fire control means including:

target tracking means for providing a target azimuth signal and a target elevation signal respectively indicative of the azimuth and elevation of a line of sight to a target being tracked with respect to said aircraft reference axis;

means for providing a range signal indicative of the range to said target; and means responsive to said range signal, said target azimuth signal and said target elevation signal for providing said azimuth command signal and said elevation command signal;

coupled aiming mode indicating means for providing a coupled aiming signal in response to activation of a flight control system coupled aiming mode; and signal processing means responsive to the presence of said coupled aiming signal for providing control surface command signals for driving the magnitude of said azimuth command signal and said elevation command signal to zero, thereby aligning said aircraft reference axis with said aiming line of sight.

2. An aircraft flight control system according to claim 1 wherein said first control means further comprises:

weapon indicating means for providing a weapon signal indicative of the type of weapon selected for firing on said target;

means responsive to said weapon signal, said range signal, said target azimuth signal and said target elevation signal for providing lead angle signals respectively indicative of the difference between an aiming trajectory of said weapon and said azimuth signal and said elevation signal; and means responsive to said target azimuth signal, said target elevation signal and said lead angle signals respectively for providing said azimuth command signal and said elevation command signal.

3. An aircraft flight control system according to claim 1 wherein said fire control means further comprises:

means responsive to said weapon signal for providing bore sight correction signals indicative of the bore site offset between said selected weapon and said aircraft reference axis; and means responsive to said target azimuth signal, said target elevation signal, said bore sight correction signals and said lead angle signals respectively for providing said azimuth command signal and said elevation command signal.

4. An aircraft flight control system according to claim 1 further comprising:

weapon indicating means for providing a weapon signal indicative of the type of weapon selected for firing on said target; and means for setting said elevation command signal equal to zero in response to said weapon signal indicating that the type of weapon selected for firing is mounted for articulation in elevation.

5. An aircraft flight control system according to claim 1 further comprising:

weapon indicating means for providing a weapon signal indicative of the type of weapon selected for firing on said target; and means for setting said azimuth command signal equal to zero in response to said weapon signal indicating that the type of weapon selected for firing is mounted for articulation in azimuth.

6. An aircraft flight control system according to claim 1 further comprising switch means operable by a pilot, said coupled aiming mode indicating means being responsive to the continuous activation of said switch means for providing said coupled aiming signal, said coupled aiming mode indicating means being responsive to the deactivation of said switch means for removing said coupled aiming signal.

7. An aircraft flight control system according to claim 6 further comprising:
fire control status indicating means for providing a valid fire control signal indicative of said fire control means operating status being within specifications;
means responsive to both said azimuth command signal and said elevation command signal being below respective threshold magnitudes for providing an enable signal; and
said coupled aiming mode indicating means being responsive to the presence of said valid fire control signal and said enable signal for providing said coupled aiming signal during continuous activation of said switch means, and responsive to the absence of either said enable signal, said valid fire control signal, or the deactivation of said switch means for removing said coupled aiming signal.

8. An aircraft flight control system for providing control surface command signals to the aircraft control surfaces thereby controlling the yaw, pitch, roll and lift attitude axes of the aircraft in flight, comprising:

fire control means for providing an azimuth command signal and an elevation command signal respectively indicative of the change in aircraft yaw attitude and pitch attitude for an aircraft reference axis to be aligned with an aiming line of sight;
switch means operable by a pilot;
fire control status indicating means for providing a valid fire control signal indicative of said fire control means operating status being within specifications;
means responsive to both said azimuth command signal and said elevation command signal being below respective threshold magnitudes for providing an enable signal;
coupled aiming mode indicating means responsive to the presence of said valid fire control signal and said enable signal for providing said coupled aiming signal during continuous activation of said switch means, and responsive to the absence of either said enable signal, said valid fire control signal, or the deactivation of said switch means for removing said coupled aiming signal; and
signal processing means responsive to the presence of said couple aiming signal for providing control surface command signals for driving the magnitude of said azimuth command signal and said elevation command signal to zero, thereby aligning said aircraft reference axis with said aiming line of sight.

* * * * *